United States Patent [19]

Kuchta

[11] Patent Number: 4,827,292
[45] Date of Patent: May 2, 1989

[54] SKEWED MATERIAL ADVANCING SYSTEM
[75] Inventor: Richard Kuchta, Tolland, Conn.
[73] Assignee: Gerber Garment Technology, Inc., Tolland, Conn.
[21] Appl. No.: 202,661
[22] Filed: Jun. 3, 1988
[51] Int. Cl.$^4$ .............................................. G01D 75/00
[52] U.S. Cl. .................................. 346/136; 400/578
[58] Field of Search ............... 346/150, 136, 134; 400/497, 578; 226/15, 14, 21, 24, 27, 36, 192

[56] References Cited

U.S. PATENT DOCUMENTS

| | | | |
|---|---|---|---|
| 3,583,540 | 6/1971 | Bernard | 346/136 |
| 4,400,704 | 8/1983 | Brown et al. | 346/136 |
| 4,761,657 | 8/1988 | Perez et al. | 346/136 |

Primary Examiner—Arthur G. Evans
Attorney, Agent, or Firm—McCormick, Paulding & Huber

[57] ABSTRACT

A system includes a work table having a flat surface which supports a first and a second sheet material during a work operation and has a carriage carrying an instrument to enable it to perform work operations on the first and second sheet materials. The first material is advanced by a first material advancing means that moves the first sheet material in a first flow direction which is coincident with the direction of movement of the carriage. A second material advancing means moves the second sheet material over the support surface and underneath the first sheet material. Guide means are oriented at each opposite end of the table to permit indexing of the sheet materials across the table. The guide means which position the second material on the surface of the work table are skewed at an angle relative to a coordinate direction which is orthogonal to the direction of movement of the carriage. The guides which position the first material above the surface of the work table are not skewed and the first sheet material is moved across the surface parallel to the direction of movement of the carriage.

12 Claims, 4 Drawing Sheets

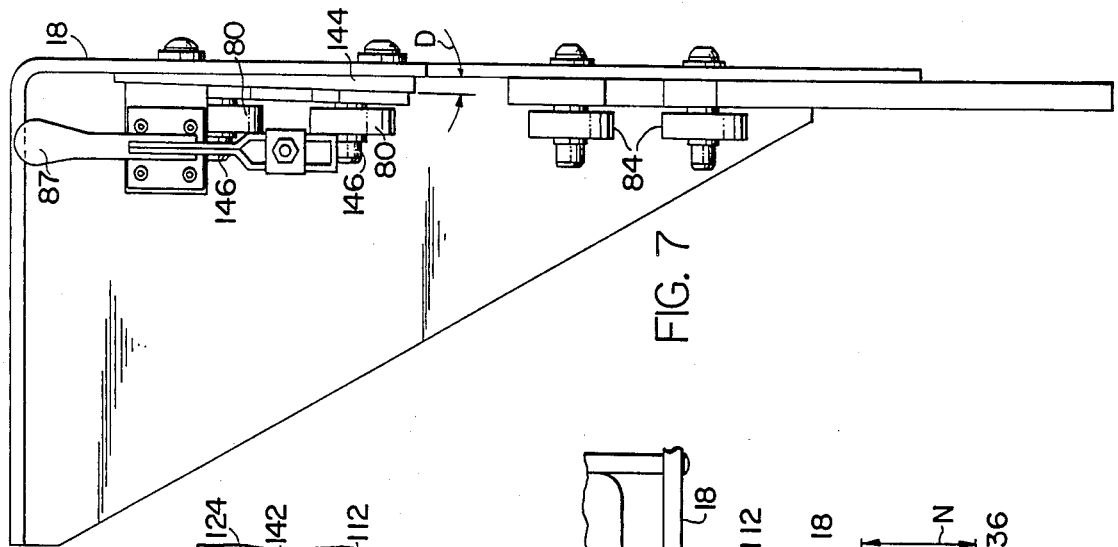
FIG. 7
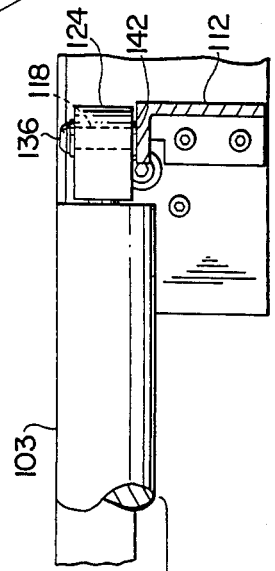
FIG. 5
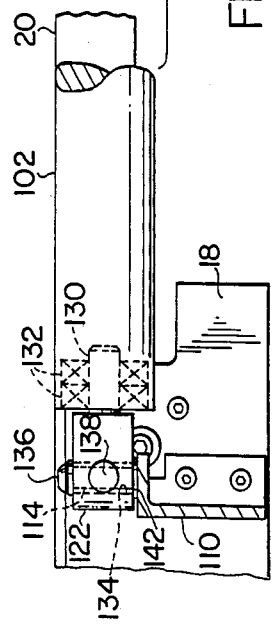
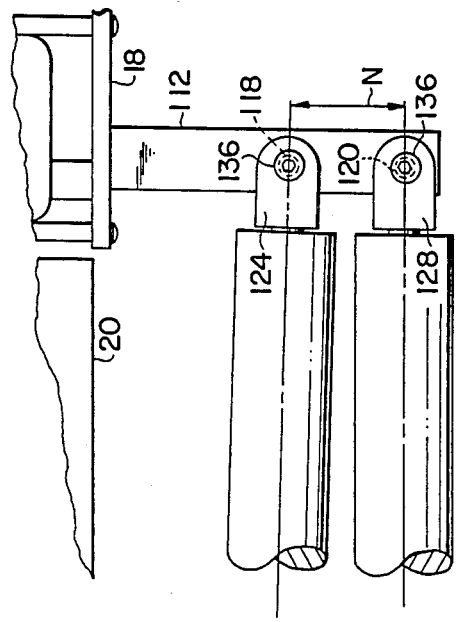
FIG. 6
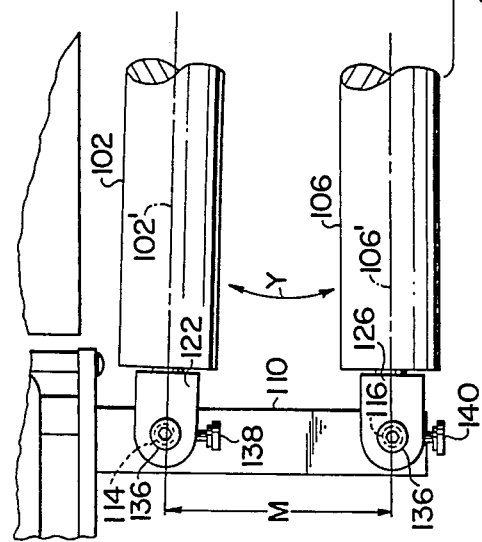

SKEWED MATERIAL ADVANCING SYSTEM

BACKGROUND OF THE INVENTION

The present invention relates to a material handling device and more particularly relates to a material handling system used in a plotter which draws graphic information on both a sheet of plotting material as well as on an underlying carbonized sheet.

It is generally known to use in a plotter rolls of carbon sheet material and plotting sheet material and to orient the respective sheets of material such that the carbonized surface of the carbon sheet upwardly faces and underlies an overlying sheet of the plotting material whereby a mechanical plotting instrument is pressed downwardly against the plotting sheet to inscribe graphic information on its surface and to transfer to the underside of the plotting material sheet a carbon imprint of this information. U.S. Pat. No. 4,512,079 issued on Apr. 23, 1985, and U.S. Pat. No. 4,400,704, issued on Aug. 23, 1983 disclose plotters utilizing a sheet of plotting material which overlays a sheet of carbon material. In these patents, each sheet of material is a continuous strip of rolled stock which is separately advanced across a work surface during a plotting operation to provide fresh material to the work surface. However, in these devices, a common problem experienced during the plotting operation is the creation of an adherence force occurring between the underlying carbon sheet and the overlying plotting sheet due to the transfer of carbon from the carbon paper to the plotting sheet when downward pressure is exerted by the plotting instrument. Thus, means must be provided to separate the adhered sheet materials from one another after the imprint has been made.

In these previously known devices, the sheet of paper material is advanced in a line of travel which is orthogonal to the line of travel of the carbon sheet material. Separation, or the elimination of adherence between the sheet of carbon material and the sheet of plotting material is accomplished in some of these devices by continuously moving the sheet of carbon material relative to the sheet of plotting material as graphic information is simultaneously generated on the overlying sheet of plotting material. However, the carbon material is expensive and the continual advancement of the carbon material during the plotting operation is not cost effective and creates an increase in the job cost for each plotting operation. Alternatively, where the carbon paper is not continuously advanced in the previously known devices, the devices must employ mechanical separating means such as a wire or a blade or the like for separating the carbon material from the plotting material. Such separating means are subject to breakdown and contribute to an increased expense in the maintenance of the system because the blades and/or wires smear flaked carbon onto other machine parts.

Accordingly, it is an object of the present invention to provide a system which includes a plotting device employing a first sheet of plotting material and a second underlying sheet of carbon material which are advanced across a work surface from opposite ends of a work table and are capable of being separated from one another without continuous movement of the carbon material relative to the plotting material.

It is yet another object of the present invention to advance the sheet of plotting material in a first direction of flow and to advance the sheet of carbon material in a second opposite direction of flow to thereby create a separating movement between the two sheets of material.

Still another object of the present invention is to provide guide means which skew the line of travel of the sheet of carbon material relative to the line of travel to the sheet of plotting material such that imprints made on the carbon material are laterally shifted as well as being forwardly advanced relative to the sheet of plotting material by small advancing increments made to the carbon sheet material.

Still a further object of the present invention is to provide a system which efficiently utilizes a sheet of carbon material during a plotting operation.

SUMMARY OF THE INVENTION

The present invention resides in a system for indexing two generally elongated strips of carbon sheet material and paper sheet material over a flat surface supported by a work table upon which a work operation is performed by an instrument. A carriage carrying the instrument is mounted for movement over the support surface in a first coordinate direction to enable the instrument to perform work operations on the two sheets of material.

The system includes a paper advance means which advances the paper sheet over the flat surface in a spaced relationship thereto from a position adjacent a first end of the table to a position adjacent the opposite, second end of the table. A carbon material advance means selectively advances the carbon sheet material between the paper sheet and the flat surface in a sliding relationship therewith. The paper material advance means further includes first and second guide means each positioned respectively adjacent to and spaced from one of the first and the second ends of the table. Each of the first and the second guide means have a longitudinal axis being parallel to one another and being parallel to a second coordinate direction which is orthogonal to the first coordinate direction.

The carbon material advance means further includes third and fourth guide means each positioned respectively, adjacent to one of the first and the second ends of the table. The third and the fourth guide means each having a longitudinal axis being parallel with one another and being skewed at a selected angle relative to the second coordinate direction.

BRIEF DESCRIPTION OF THE DRAWINGS

FIG. 5 is an end view taken in section along line 5—5 in FIG. 2 which shows the connection between the carbon material idler rollers and the table.

FIG. 6 is a top view of one end of the table showing the orientation between the carbon material idler roller and the plotting material idler roller.

FIG. 7 is a sectional view through the work table showing the skewed support for the carbon feed and takeup spindles.

DETAILED DESCRIPTION OF THE PREFERRED EMBODIMENT

Figure 1:
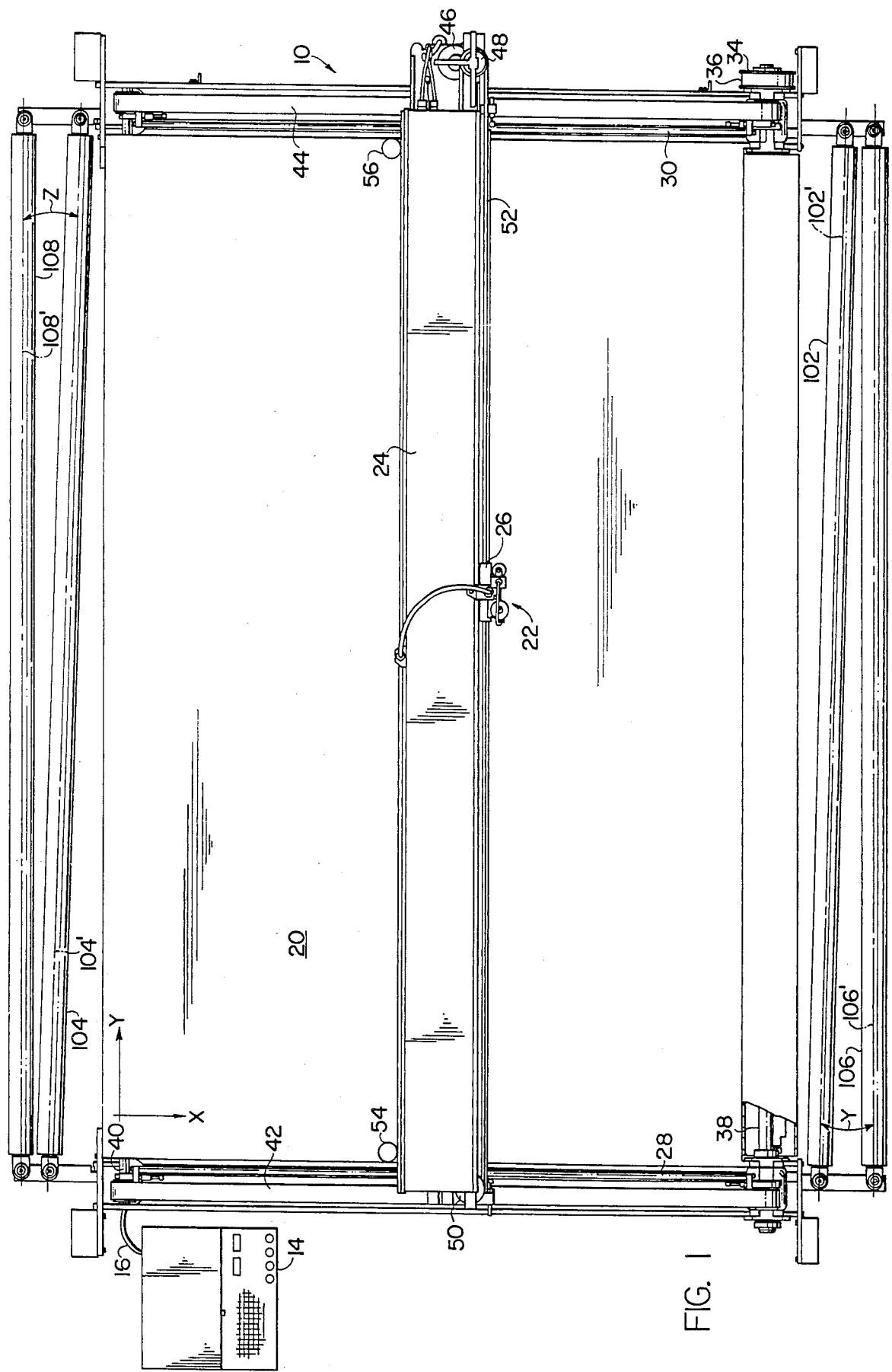
FIG. 1 is a top view of an automatically controlled plotter which employs the material advance means of the present invention.
Figure 2:
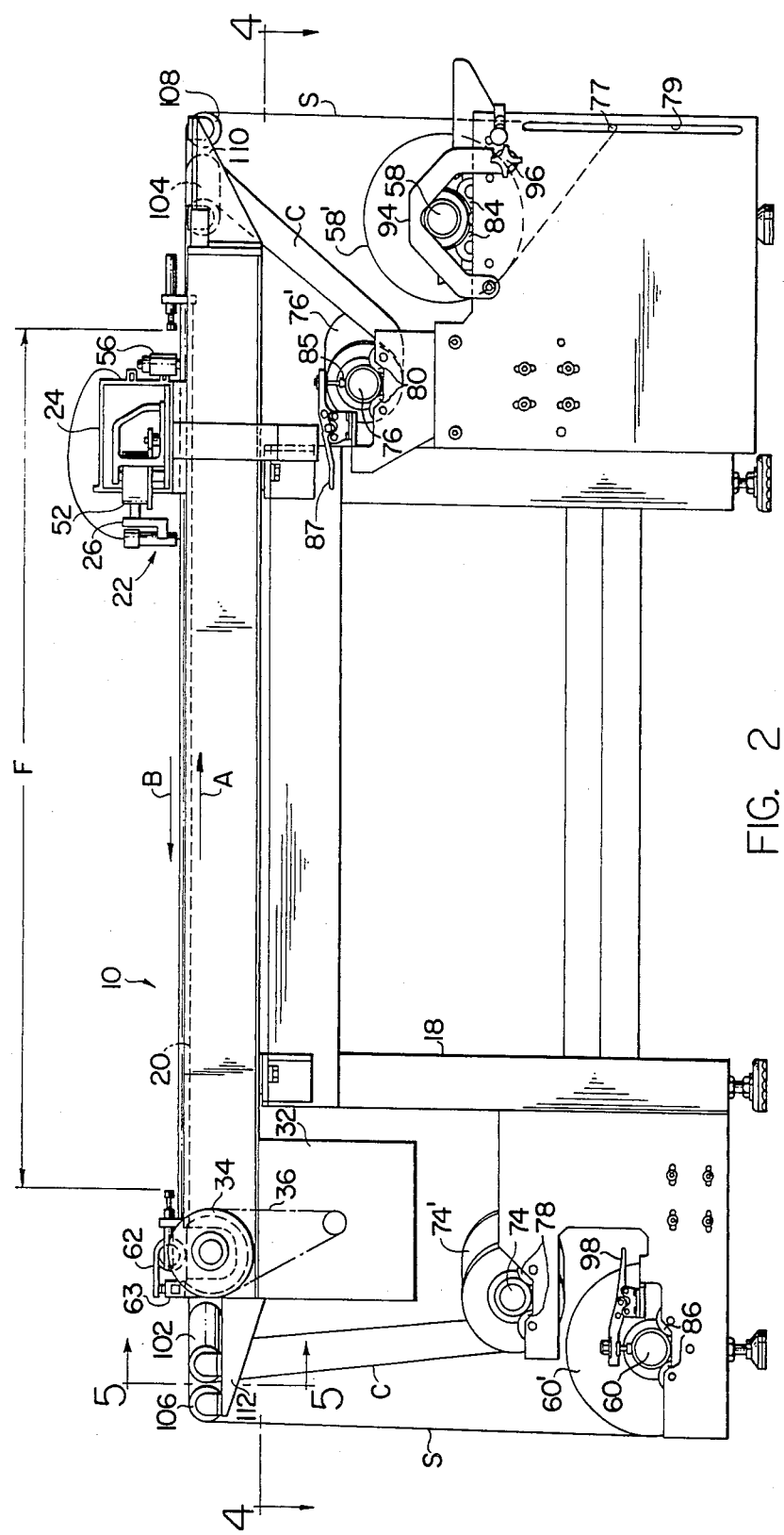
FIG. 2 is a side elevation view showing the automatically controlled plotter of FIG. 1.

Turning to the drawings and first referring to FIGS. 1 and 2, an automatically controlled plotter is generally shown by the reference numeral 10 and a controller 14 having a computer is connected with the plotter 10 through the cable 16. The controller 14 reads a cutting program from an input source such as a tape or a disc and translates the programmed information into command signals which control the operation of the plotting system.

The plotter 10 is comprised of a table 18 having an upwardly disposed work surface 20 on which strips of plotting material S and C are supported in the course of a plotting operation while a plotting head or instrument 22 is moved over the surface 20 by means of an X carriage 24 and a Y carriage 26 to produce a trace line on the material. The material S typically employed is a lay flat bond paper having a thickness in the range of 3 to 5 thousandths of an inch. Such paper may be mechanically engaged and indexed across the table and has sufficient internal rigidity that short segments of four feet or more may be pushed off the appropriately smoothed and prepared surface 20 of the table without buckling. The surface 20, for example may be formed from aluminum that is covered with a thin layer of antistatic rubber. The plotting material C is directly supported on the surface 20 and underlies the sheet material S. The carbon sheet material C has at least one carbonized surface facing upwardly in adjacent relationship with the underside of the sheet material S. Thus, when the mechanical plotting instrument 22 which comprises either a pencil or a stylist is pressed downwardly against the plotting material S, the carbonized surface of the material C is transferred to the underside of the material S to produce a highly visible negative of the plot that is suitable for reproduction. The X carriage 24 travels in the illustrated X-coordinate direction relative to the table 18 on round ways 28 and 30 oriented at opposite sides of the table 18. Movement of the X carriage 24 is produced by means of an X drive servo motor 32 which rotates a pulley 34 using a drive belt 36. The pulley 34 is fixed to a drive axle 38. A driven axle 40 is spaced from the drive axle 38 and is rotatably driven by a pair of toothed drive belts 42 and 44. A downwardly extending portion 25 (FIG. 3) of the X carriage 24 attaches to each of the belts 42 and 44 to transmit the motion of the belts 42 and 44 to the X carriage 24.

The Y carriage 26 is mounted on the X carriage 24 for movement in the illustrated Y-coordinate direction and the carriage is moved by means of a Y drive servo motor 46 mounted on the X carriage 24. The motor 46 drives a drive pulley 48 which is rotatably connected with a driven pulley 50 by a single toothed drive belt 52 engaging each of the pulleys 48 and 50. The Y carriage 26 is fixedly attached to the belt 52 and is accordingly moved in the Y-coordinate direction when the motor 46 is activated and is turned in either of its rotational directions. Command signals from the controller 14 operate the servo motors 32 and 46 to move and position the plotting instrument 22 over the work surface 20 and additional commands cause an actuator such as a solenoid or a pneumatic piston to vertically move the plotting instrument 22 to engage or disengage the strip of sheet material S to produce graphic information during the movement.

In order to bring new segments of the plotting material S onto the surface 20 of the plotting table 18, the X carriage 24 carries at opposite ends solenoid actuated couplings 54 and 56 which engage selected portions of the longitudinal edges of the sheet material S and permit the X carriage 24 to pull the next segment of sheet material S from a feed roll 58' positioned adjacent a first end and to advance the plotted segment toward a second opposite end of the table onto a takeup roll 60' positioned adjacent to the second end of the table. At the appropriate time in the course of the plotting operation, the X carriage 24 driven by the motor 32 is moved to the feed position adjacent the first end of the table 18 as shown generally in FIG. 2 and the couplings 54 and 56 are actuated to couple the sheet material S to the carriage 24. The carriage 24 is again moved by the motor 32 toward the S material discharge position at the opposite second end of the table and, at the same time, pulls a new segment of the plotting sheet material S onto the surface 20. The newly advanced segment of sheet material is then clamped down onto the surface 20 by a clamping bar 62 which is preferably actuated by a pneumatic source energizing an actuator 63. Subsequently, the couplings 54 and 56 are deenergized and the X carriage 24 is then free to move along the illustrated X-coordinate direction and to continue the plotting operation in conjuction with the movements of the Y carriage 26 along the illustrated Y-coordinate direction.

Figure 3:
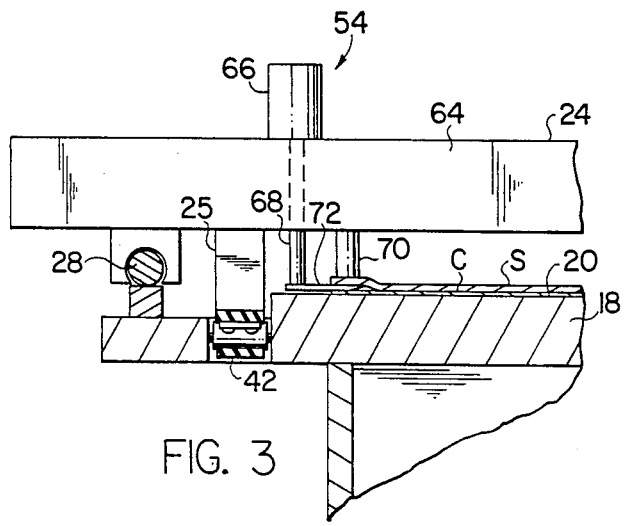
FIG. 3 is a fragmentary horizontal elevation view of the plotting carriage and table at one side.

FIG. 3 illustrates one embodiment of the coupling 54 that can be employed for coupling the edge portion of the sheet material S to the X carriage 24. The carriage 24 has a base flange 64 upon which the couplings 54 and 56 are fixed. Each coupling comprises a solenoid 66 having a movable armature 68 extending downwardly from the base 64 to a position slightly above the surface 20 of the table 18. A clamping post 70 is fixed to the underside of the base 64 and depends downwardly therefrom to a position immediately above the top surface of the sheet material S. A thin clamping member 72 having a thickness between 1/16 and ⅛ of an inch and being preferably shaped as a disc and being formed from a reinforced metal alloy such as aluminum and having a portion covered with high friction rubber or the like is connected to the lower end of the movable armature 68. The clamping member 72 has a portion which laterally projects under the sheet material S between the layer of carbon material C and the plotting material S which are supported on the table surface 20. The upper edge of the clamping member 72 is chamfered upwardly about its entire circumference thus allowing the upper surface of the clamping member 72 to easily slide below the sheet material S along the respective longitudinal edge of the material. The clamping post 70 has a flat undersurface which coacts with the movement of the clamping member 72 to clamp the respective longitudinal edges of the material S therebetween when the solenoid 66 is energized and the movable armature 68 and the clamping member 72 is drawn upwardly toward the clamping post undersurface. Once the couplings 54 and 56 are energized and the sheet material S is clamped to the X carriage 24, the sheet material S moves as an integral unit with the carriage 24 over the surface 20, and during this movement there is no change in the positional relationship of the clamped sheet material S, the X carriage 24 and the instrument 22. Thus, the plot may be continued from one segment of the sheet material S to another fresh segment without any apparent discontinuity.

Figure 4:
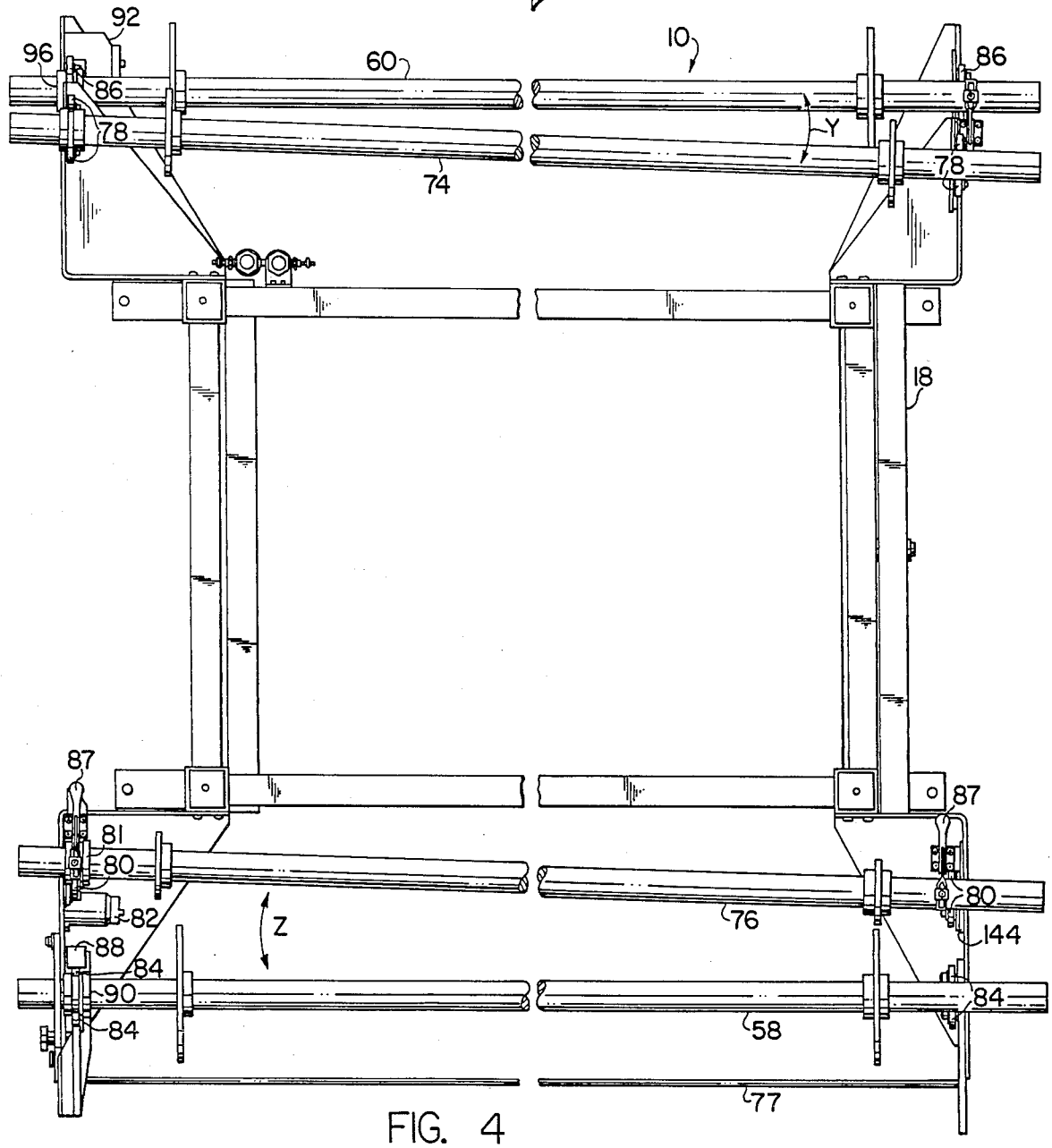
FIG. 4 is a sectional view taken along line 4—4 in FIG. 2 and shows the spindles employed in the automatically controlled plotter of the present invention.

In accordance with the present invention, the plotter 10 employs two layers of sheet material respectively labeled S and C which are supported by the table 18 and flow in opposite directions with one another. As shown in FIGS. 2 and 4, sheet material C is provided by a feed roll 74' which is mounted on a feed spindle 74. Each end of the spindle 74 is rotatably supported by two support rollers 78 which are freely rotatable relative to the table 18 and are fixed thereto. A carbon material takeup roll 76' is mounted on a takeup spindle 76 located at the opposite end of the table 18 opposite the spindle 74. Each end of the spindle 76 is rotatably supported by the table 18 on a pair of support rollers 80 which are rotatably fixed to the side wall of the table 18. The spindle 76 has at least one collar 81 having an annular groove which is positively engaged through gear means with a material advancing servomotor or pulse receiving D.C. motor 82. The motor 82 in turn rotate the takeup spindle 76 which downwardly bears upon each of the support rollers 80. The rollers 80 on at least one end of the spindle 76 are received within the annular groove of the collar 81 which prevents the spindle 76 from being moved laterally. Also, vertical retaining clamps 87 having an adjustable bearing element 85 which is brought into engagement with the spindle surface 76 prevents the spindle from moving upwardly out of engagement with the support rollers 80. One of the bearing elements 85 is received within the groove formed in the collar 81 on the spindle 76 and applies sufficient downward force on the roller 80 to maintain the drive engagement between the collar 81 and the motor 82. Thus, the sheet material C is supplied by the feed roll 74' mounted on the feed spindle 74 and freely rotates on the rollers 78 and when the advancing motor 82 is energized, it in turn rotates the takeup spindle 76 to advance the material C onto the takeup roll 76' in the flow direction illustrated as A in FIG. 2.

As previously discussed, the sheet material S is advanced in segments along the surface 20 by the X carriage 24 and the couplings 54 and 56 which pull the fresh sheet material S from the feed roll 58' and advance it along the flow direction indicated as B to the takeup roll 60'. Spindles 58 and 60 are rotatably supported on the table 18 respectively by support rollers 84 and 86. The feed spindle 58 is generally allowed to spin freely on the support rollers 84. However, due to the excessive inertia created by the size of the roll 58' when the sheet material S is being pulled from it, a brake 88 which is activated by the controller 14 cooperates with the spindle 58 to brake and limit the rotation of the spindle 58 as the X carriage 24 nears the discharged position at the opposite second end of the table 18 as shown in FIG. 2. At one end of the spindle 58 is formed a collar 90 having an annular groove (FIG. 4) receiving each of the support rollers 84 to thus prevent movement of the feed spindle 58 in the lateral direction. Also, a generally V-shaped bracket 94 is pivotably attached with the table 18 and is rotated into bearing engagement with the outer surface of the spindle 58 and is thereafter secured in place by a locking mechanism 96.

Once graphic information has been drawn on the sheet material S and imprinted on sheet material C, a segment of the material S is advanced toward the discharge position on the table 18. The takeup roll 60' is rotated in unison with the movement of the X carriage 24 by a takeup motor 92 which drivingly engages with gear means formed within a groove in a collar 96 of the spindle 60. The annular groove in the collar 96 receives the support rollers 86 thus preventing the spindle 60 from moving laterally. A clamp 98 having a downwardly depending, adjustable bearing element similar to element 85 which contacts the surface of the spindle 60 applies downward force on the spindle 60 to maintain the drive between the motor 92 and the surface of the spindle 60. Thus, as the used segment of the sheet material S is advanced along the line of flow B on the table 18, the drive takeup motor 92 is energized by commands from the controller 14 to rotate the spindle 60 and wind the advanced sheet material S onto the takeup roll 60'. It should be appreciated however, that the motor 92 does not rotate the shaft 60 to pull the advancing segment of material S off the table 18. In summary, the automatically controlled plotter of the present invention employs a first sheet material C which is directly supported on the surface 20 and which moves in a first direction of flow and employs a second sheet material S which overlays the sheet material C and which is moved in a direction of flow opposite that of the sheet material C.

Further in accordance with the invention, the line of travel of the sheet material C is skewed relative to the line of travel of the sheet material S. Inwardly oriented idler rollers or guides 102 and 104 are rotatably supported by the table 18 to guide the sheet material C onto and off of the support surface 20 as it is being advanced. Likewise, idler rollers or guides 106 and 108 are respectively positioned and supported by the table 18 outwardly of each of the rollers 102 and 104 to guide the sheet material S over the underlying sheet material C as the sheet material S is being advanced by the X carriage 24 when the couplings 54 and 56 are activated and the carriage is moved toward the second end of the table 18. As can be seen from the figures and in particular FIG. 1, each of the rollers 102, 104, 106 and 108 have longitudinally extending axes respectively labeled as 102', 104', 106' and 108'. The longitudinal axes 108' and 106' of the outwardly oriented rollers 108 and 106 are parallel with one another and with the illustrated Y-coordinate direction. Thus, the sheet material S, guided by each of the rollers 106 and 108, has a line of travel coincident with the illustrated X-coordinate direction and is accordingly capable of being moved in a generally parallel relationship with the advancing movements of the carriage 24. This allows the couplings 54 and 56 to readily engage respective lateral edges of the sheet S anywhere along the entire length of each edge.

The rollers 102 and 104 which guide the sheet material C and have longitudinal axes 102' and 104' are skewed however at an angle relative to the longitudinal axis of each adjacently oriented roller 106 and 108. The roller axis 102' is skewed relative to the roller axis 106' at an angle labeled Y and the roller axis 104' is skewed relative the roller axis 108' at an angle labeled Z. The angles Y and Z are equal and as such, the inner rollers 102 and 104 are oriented parallel with one another. Thus, the sheet material C which is being guided by the rollers 102 and 104, is moved across the surface 20 of the table 18 at an angle which is skewed relative to the illustrated X-coordinate direction. It should be appreciated that the skewed arrangement allows marks created on the carbonized surface of the sheet material C by the plotting instrument 22 acting through the overlying sheet material S to be moved an incremental distance along the illustrated Y-coordinate axis for any corresponding incremental movement of the sheet material C along the illustrated X-coordinate axis.

Referring now the FIGS. 5 and 6, and in particular to the connection between the table 18 and each of the rollers 102, 104, 106, and 108, support brackets 110 and 112 are rigidly fixed along the first and second ends of the table 18 and support each of the idle rollers 102, 104, 106 and 108 in a spaced relationship with one another and with the table 18. The bracket 110 has two, upwardly extending mounting pins 114 and 116 which are spaced along the bracket 110 at a distance M and are fixedly secured to the bracket. Likewise, the bracket 112 has two upwardly extending mounting pins 118 and 120 which are spaced apart at a distance N and which are fixedly secured to the bracket 112. Each idler roller is supported at its longitudinal ends by a set of journaling blocks 122 and 124, 126 and 128 which rotatably secure each of idler rollers 102, 104, 106 and 108 to the respective ones of the brackets 110 and 112.

As shown in FIG. 5, an outwardly depending stub 130 extends from each block and is received witin an axially oriented blind bore formed at each end of the idler rollers. Each bore houses a series of journaling bearings 132 which receive the correspondingly cylindrically shaped surface of the stub in a bearing relationship. Also, the journaling blocks 122, 124, 126 and 128 each contain a through bore 134 which receives a respective one of the mounting pins 114, 118, 116 and 120. A retaining bolt 136 having a lock washer is threaded axially into the longitudinal extent of each mounting pin to thereby clamp each journaling block onto the respective one of the brackets 110 and 112. The bores 134 in each of the journaling blocks 122 and 126 is preferably slightly oversized relative to the diameter of each of the mounting pins 114 and 116. A second threaded opening oriented perpendicularly to and communicating with the through bore 134 is formed in each of the journaling blocks 122 and 126. Takeup bolts 138 and 140 respectively communicate into each of the threaded openings in the journaling blocks 122 and 126 to provide a fine adjustment mechanism for the support structure. As is shown in FIG. 6 however, the mounting pins which are fixed to each of the brackets 110 and 112 are assembled at the spacing illustrated as M and N. Since the distance M is greater than the distance N, the mounting pins 114 and 116, 118 and 120, generally define the skewing angles Y and Z. The takeup bolts 138 and 140 are used however to fine tune the position of the rollers 102, 106 and 104, 108 to thus prevent any distortion of the sheet materials S and C as each sheet is advanced across the table and is guided by its respective roller pair. Also, since the rollers will rotate as the sheet materials C and S are advanced, static electricity will not build up on the engaging surface of each roller as would otherwise occurred if a smooth, stationary guide lip were employed.

In accordance with a further aspect of the invention, the inwardly oriented idler rollers 102 and 104 are supported by the brackets 110 and 112 such that the upper extent or edge 103 of each of the rollers 102' and 104 in side view is coincident with the plane defining the surface 20. As is shown in FIG. 5, each of the journaling blocks 122 and 124 is supported in a spaced relationship with the upper surface of each of the brackets 110 and 112 by flat washers 142 which concentrically surround pins 114 and 118. These washers have thicknesses which accurately align the upper extent or edge 103 of the rollers 102 and 104 coincidently with the plane defined by the surface 20 as is shown in FIG. 5. The journaling blocks 126 and 128 which support the outwardly disposed rollers 106 and 108 are likewise supported on the brackets 110 and 112 by flat washers which concentrically surround each of the pins 116 and 120 and are interposed between the bracket upper surface and the journaling block lower surface. While the washers supporting the journaling blocks 126 and 128 have equal thicknesses, the thickness of each of these washers exceeds the thickness of the washers 142 supporting the blocks 122 and 124 by approximately 30 thousandths of an inch to 50 thousandths of an inch. Thus, the outwardly oriented rollers 106 and 108 are slightly elevated above the inwardly oriented rollers 102 and 104 and the table surface 20. This feature importantly promotes the separation of the sheet material C from the sheet material S. As discussed previously, the plotting instrument 22 bears directly down onto the sheet material S and imprints its mark onto the carbonized surface of the underlying sheet material C and causes the two sheet materials to become adhered together in the region of the imprint. Thus, as the sheet material C is moved in the direction flow labeled A and as the sheet material S is moved in the direction of flow labeled B, the small difference in height between the idler roller pairs 106, 102 and 104, 108 creates a separating or a pulling apart action in the region of the roller pairs which permeates inwardly along each of the sheet materials when one sheet is moved relative to the other.

It is a feature of the invention to provide means which skew each of the carbon material spindles 74 and 76 at angles Y and Z, respectively, relative to the illustrated Y-coordinate directional axis such that each of the spindles 74 and 76 is oriented substantially parallel with the respective one of the idler rollers 102 and 104. Referring now to FIG. 7, a modified support structure is employed to mount each of the support rollers 78 and 80 in a skewed relationship with the table 18. As a result, the modified support also orients each of the spindles 74 and 76 in a skewed relationship to the illustrated Y-coordinate directional axis. A skewing plate 144 has two opposite lateral surfaces which are tapered with respect to one another to form an angle D of approximately 1.5 degrees. Each of the rollers 80 and 78 are rotatably secured on shafts 146 which depend outwardly from the skewing plate 144 and accordingly skew each of the rollers 80 and 78 relative to the illustrated Y-coordinate directional axis by approximately 1.5 degrees.

After a graphic information has been drawn upon the surface of the sheet material S and subsequently imprinted onto the underside of the sheet material S by the underlying sheet material C, the controller 14 will automatically advance the next segment of sheet material S onto the surface 20 of the table 18. Simultaneously, the underlying sheet material C will likewise be advanced in the opposite direction onto the takeup roll 76' when the servomotor 82 is energized by a signal from the controller 14. As is shown in FIG. 2, the distance F illustrates a typical segment length of the sheet material S which is advanced by the X carriage 24. The distance F has a length of approximately forty inches. The carriage 24 when coupled to the sheet material S first advances the sheet material S at a speed of approximately one inch per second and then ramps up to ten inches per second thus rapidly advancing a new segment of the sheet material S onto the surface 20 of the table 18 after initial separation between sheet S and C occurs. However, the carbonized sheet material C is selectively advanced by the controller 14 at a slower speed at approximately 1.5 inches per second. Thus, for equal given time periods, the displacement of the carbonized sheet material C relative to the displacement of the sheet material S is substantially less. Thus a savings in the amount of the sheet material C used in a given operation is achieved.

Since the line of travel of the sheet material C is skewed relative to the line of travel of the sheet material S, any imprint made onto the carbonized surface of the sheet material C is not only advanced along the illustrated X-coordinate directional axis but is also laterally moved from its preceeding position along the illustrated Y-coordinate directional axis. Angles Y and Z measure 1.5 degrees and generate lateral translation of a mark made on the sheet material C along the illustrated Y-coordinate directional axis which measures a distance equal to approximately one line thickness for every 1.5 inch segment of the sheet material C advanced. This feature is important because the controller 14, in using the internal program that controls the functions of the plotter 10 and in using the data describing the graphic information to be plotted, may selectively advance only a small segment of the carbonized sheet material C to laterally offset an imprint previously made on the carbonized sheet material C a distance of a single line width to thus efficiently avoid plotting on the previously made imprint. As a result, a substantial savings in the amount of carbonized sheet material C is achieved because the controller 14 may advance only enough carbonized sheet material C to laterally shift and forwardly move preexisting imprinted lines made on the surface of sheet material C from lying directly under the next subsequent plot. Depending on the plot, it may be possible to only advance the carbonized sheet material C an increment of 1.5 inches for every forty inch segement of the material S being advanced.

In summary, a typical indexing operation takes place as follows. When plotting on one segment of the sheet material S is completed and while the clamp bar 62 is holding the sheet material C and S firmly against the support surface 20, the X carriage 24 is translated to a position on the table 18 adjacent the rollers 104 and 108 with the plotting instrument elevated above the materials C and S in a nonplotting postion. The couplings 54 and 56 are then actuated by a command from the controller 14 and engage the sheet material S with the carriage 20. Since the idler rollers 106 and 108 support the sheet material S above the surface 20 of the table 18 as previously discussed, the upward movement of the clamping member 62 of each of the couplings 54 and 56 does not substantially distort or lift the sheet material S out of the plane defined by the upper extent or edge of the rollers 106 and 108.

The clamping bar 62 then releases the sheet materials C and S from the surface 20 and the controller 14 then causes the X carriage 24 to move from a feed end to a discharge end and to pull a new segment of the sheet material S onto the support surface 20. During the movement, the segment of the material S between the carriage 24 and the takeup roll 60' is not in tension because the carriage 24 translates toward the discharge end of the table 18 at about the same rate that the drive motor 92 retrieves the displaced segment on the takeup spindle 60. At the same time that the carriage 24 is moving a segment of the sheet material S off the support surface 20, it is pulling a new segment of the material S onto the surface under tension. The brake 88 as shown in FIG. 4 retards the rotation of the feed roll 58' as the X carriage 24 nears the discharge end of the table 18. A dancer bar 77 freely travels in a vertically oriented slot 79 and provides constant tension and working loop thus preserving the even payout of the sheet material S from the feed roll 58'. Once the clamping bar 62 is again activated and clamps the sheet materials S and C down onto the surface 20 of the table 18, the brake 88 is then released.

The controller 14 selectively activates the takeup motor 82 and incrementally advances the sheet material C an amount determinable by the controller 14 to provide a generally fresh carbonized surface beneath the sheet material S as previously discussed. At that point, the clamping bar 62 is then activated and clamps both sheet materials S and C onto the surface 20. The sheet material S is thus maintained in a slightly spaced relationship with the sheet material C through the tension created by the dancer bar 77. However, the plotting instrument 22 has sufficient downward force to press the localized region of the sheet material S downwardly into positive contact with the carbonized surface of the sheet material C when the plot is being drawn. The plotting operations continue successively on the sheet materials until a complete plot that is substantially longer than the length of the plotting table is finished.

While the present invention has been described in a preferred embodiment, it should be understood that numerous modifications and substitutions can be had without departing from the spirit of the invention. For example, the particular work operation performed by the X carriage 24 is not limited to plotting and therefore tools other than plotting instruments may be involved. Accordingly, the present invention has been described in a preferred embodiment by way of illustration rather than limitation.

We claim:

1. A system comprising:
   a work table having a flat support surface which supports first and second sheet materials during a work operation;
   a carriage carrying an instrument and being mounted for movement over the support surface in a first coordinate direction to enable the instrument to perform work operations on the first and the second sheet materials;
   a first material advance means for advancing the first sheet material over the support surface in a spaced relationship thereto from a position adjacent a first end of the table to a position adjacent an opposite, second end of the table;
   a second material advance means for advancing the second sheet material over the support surface in a sliding relationship therewith, said second sheet material being oriented between said first sheet material and said support surface during said work operation;
   said first material advance means further including first and second guide means each positioned respectively adjacent to and spaced from one of said first and second ends of said table; said first and said second guide means each having a longitudinal axis being parallel with one another and being parallel with a second coordinate direction which is orthogonal to said first coordinate direction;

said second material advance means further including third and fourth guide means each positioned respectively adjacent to one of said first and second ends of said table, said third and said fourth guide means each being oriented inwardly of said respective ones of said first and second guide means and each having a longitudinal axis being parallel with one another, and each of said longitudinal axes of said third and said fourth guide means being skewed at a selected angle relative to said second coordinate direction.

2. A system as defined in claim 1 wherein said second material advance means selectively advances the second sheet material from a position adjacent said second end of the table to a position adjacent said first end of said table such that said first material advance means advances said first sheet material in a first flow direction and said second material advance means indexes said second sheet material in a second, opposite flow direction to that of said first material advance means.

3. A system as defined in claim 2 wherein said first material advance means further includes coupling means operatively associated with said carriage for engaging said first sheet material and coupling the same to said carriage for movement from said first end of said table to said second end of said table.

4. A system as defined in claim 3 wherein said first and said second guide means are rollers rotatably supported by said table and are rotated by bearing engagement with said first sheet material as it is being advanced by the first material advance means.

5. A system as defined in claim 4 wherein said third and said fourth guide means are rollers rotatably supported on said table and are rotated by bearing engagement with said second sheet material when it is being indexed by said second material advance means.

6. A system as defined in claim 5 wherein said third and said fourth guide means rollers are positioned relative to said flat surface such that the upper extent of each of said third and said fourth guide means rollers is coincident with the plane defining said flat support surface on said work table; and wherein said first and said second guide means rollers are positioned laterally outwardly of each of said third and fourth guide means rollers and are further positioned on said table such that each of said first and second guide means rollers has an upper extent which is elevated above said plane defining said flat support surface of said work table.

7. A system as defined in claim 6 wherein said coupling means includes two laterally spaced apart clamping members oriented at opposite longitudinal ends on said carriage, each of said clamping members being vertically movable relative to said carriage;

each of said clamping members being thinly sized to cooperate between said first and said second sheets of material; each of said clamping members cooperating with a clamping post depending from said carriage whereby said first sheet material is clamped between said clamping members and each of said respective clamping post to thereby move said first sheet material unitarily with the advancing movement of said carriage.

8. A system as defined in claim 6 wherein said instrument is a pencil or stylus and is downwardly pressed against the first and the second sheet materials and moved relative thereto to imprint upon the same a line; and wherein said selected skew angle is equal to approximatley 1.5 degrees whereby said second material advance means laterally shifts the imprint made by said pencil or stylus one line thickness along said second coordinate direction for a given indexing increment.

9. A system as defined in claim 7 wherein said first material advancing means includes a feed spindle positioned adjacent said table first end and a takeup spindle positioned adjacent said second end, said first material feed spindle and said first material takeup spindle having axes parallel to one another and said second coordinate direction; and wherein said first material feed spindle is associated with brake means and said first material takeup spindle is associated with a first material takeup motor.

10. A system as defined in claim 9 wherein said second material advance means includes a second material takeup spindle positioned adjacent said table first end and a second material feed spindle is positioned adjacent said table second end;

said second material takeup spindle being associated with a second material drive motor; and wherein each of said second material spindles being oriented parallel with one another and with each of said third and fourth guide means rollers and being skewed at said selected angle of 1.5 degrees relative to said second coordinate direction.

11. A system as defined in claim 10 wherein said first sheet material is plotting paper and wherein said second sheet material is carbon paper having its carbonized surface facing upwardly and confronting the lower surface of the first sheet material paper.

12. A system as defined in claim 11 wherein said first material advance means and said second material advance means include control means for selectively indexing each of said first and second sheet materials across said support surface.

* * * * *